United States Patent [19]

Cienkus, Jr. et al.

[11] Patent Number: 5,518,333
[45] Date of Patent: May 21, 1996

[54] STUDDED T-POST CONNECTOR

[75] Inventors: William J. Cienkus, Jr., Crete; Ronald E. Owczarzak, South Holland, both of Ill.

[73] Assignee: CHS Acquisition Corp., Chicago Heights, Ill.

[21] Appl. No.: 301,129

[22] Filed: Sep. 6, 1994

[51] Int. Cl.⁶ .................................................. E04H 17/14
[52] U.S. Cl. .................. 403/169; 47/45; 256/59; 256/65; 403/205; 403/217; 403/218; 403/378
[58] Field of Search .................. 47/45 C; 256/59, 256/65; 403/169, 170, 205, 217, 218, 378

[56] References Cited

U.S. PATENT DOCUMENTS

| | | | |
|---|---|---|---|
| 413,730 | 10/1889 | Palmer | 403/205 X |
| 2,149,844 | 3/1939 | George | 403/169 X |
| 4,623,756 | 11/1986 | Wilson, Jr. | 174/158 F |
| 4,889,322 | 12/1989 | Wagner | 256/36 |
| 4,936,550 | 6/1990 | Wickham et al. | 256/36 |
| 5,356,101 | 10/1994 | Malloy | 248/156 |

FOREIGN PATENT DOCUMENTS

| | | | |
|---|---|---|---|
| 1252395 | 12/1960 | France | 256/65 |
| 320203 | 5/1957 | Switzerland | 47/45 C |

*Primary Examiner*—Kenneth J. Dorner
*Assistant Examiner*—Andrea Chop
*Attorney, Agent, or Firm*—Jones, Day, Reavis & Pogue

[57] ABSTRACT

A connector for a studded T-post comprises a tube having an internal keyway therein. The keyway slidingly receives a studded T-post and is configured to prevent relative rotational movement of the post within the tube when the post is inserted into the tube. A locking member passes through the tube and cooperates with studs of the T-post to inhibit longitudinal movement of the T-post within the tube. A second similar tube may be attached to the first tube such that two T-posts may be inserted in the respective tubes and supported relative to one another in any number of angular orientations, thereby providing support for a wire-formed trellis.

15 Claims, 3 Drawing Sheets

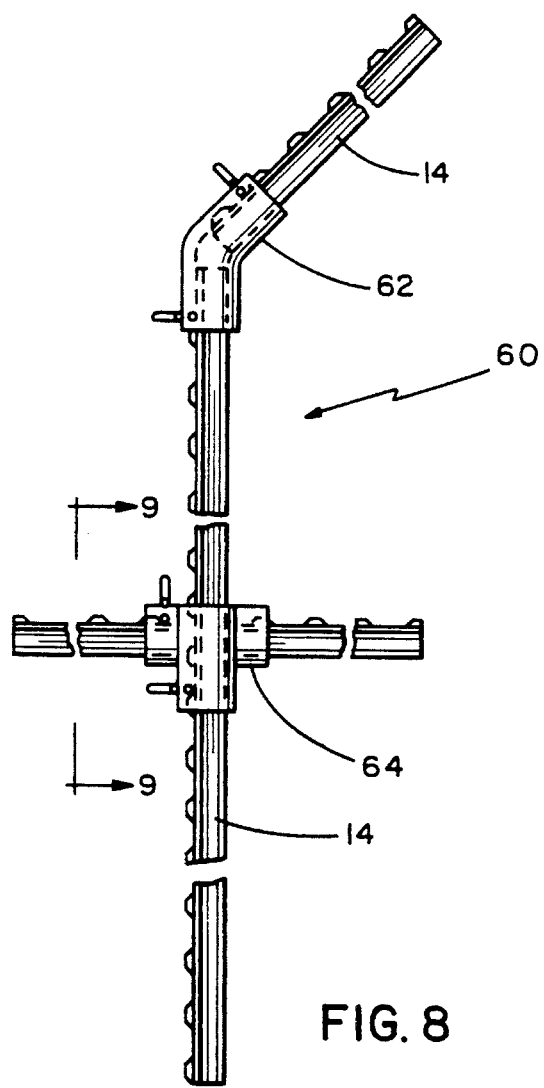
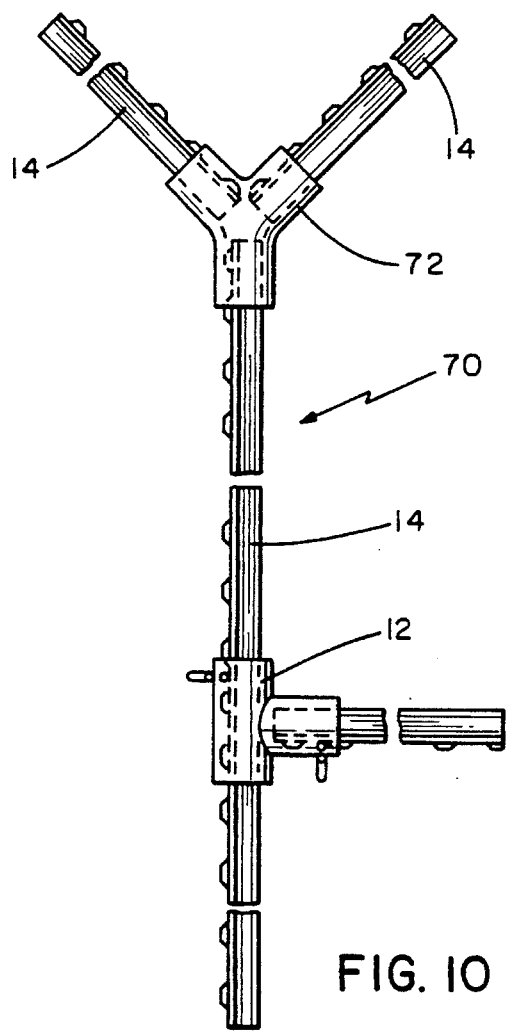
FIG. 8
FIG. 10
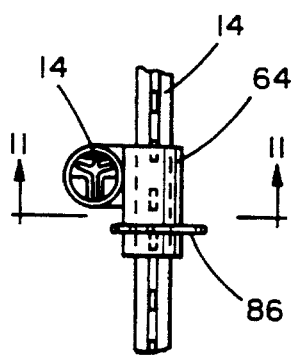
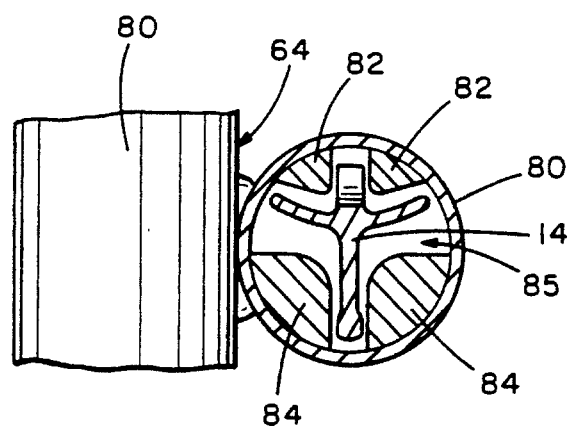
FIG. 9
FIG. 11

STUDDED T-POST CONNECTOR

BACKGROUND OF THE INVENTION

1. Field of the Invention

The present invention relates generally to a connector system for interconnecting post members, and it relates more particularly to a connector system for interconnecting studded steel T-posts.

2. Description of the Prior Art

Studded steel T-posts have long been available for use as fence posts, sign posts and the like. Such posts have a generally T-shaped cross-section with generally triangular studs uniformly spaced and projecting at right angles outwardly with respect to the cross member of the T-configuration. Typically, these posts are used with steel or aluminum wire to construct fences. The wire can be easily strapped to the post at a plurality of heights by wire strapping. The studs of the post prevent the fence wire and wire strapping from slipping on the post, thereby positively locating the fence wire at a desired height from the ground. The T-configuration of the post causes the post to be extremely strong in bending. Accordingly, studded T-posts have gained wide acceptance as strong, long lasting posts for use in constructing wire fencing or for sign posts.

Studded T-posts can be advantageously used in applications other than the construction of fences or signs. We have found that one such use is in the fabrication of a trellis. Trellises are widely used, for example, in the commercial grape growing business. A trellis system may consist of a main vertical post member anchored in the ground and having post segments branching off the main post in a variety of directions. Multiple wires may then be strung from the main post and branch segments to provide a trellis system suitable for supporting climbing plants such as grape vines, for example.

A disadvantage of using studded T-posts, as currently known, for trellis systems is that these posts do not easily bend and there are no means currently available for readily interconnecting studded T-posts together in the configurations now practiced in the construction of trellis systems. Studded T-posts can be specially cut and welded together in various configurations. However, such construction would be time consuming and inconvenient in actual practice. Accordingly, it would be desirable to provide a connector system especially well-suited for interconnecting studded T-posts in a variety of configurations adaptable for use as trellises. It would further be desirable to provide a trellis system made from studded T-posts which are easily assembled and disassembled and which can be adjusted and re-adjusted at any given time.

SUMMARY OF THE INVENTION

The present invention improves over the prior art by providing a connector for a studded T-post comprising a tube having an internal keyway therein. The keyway slidingly receives a studded T-post and is configured to prevent relative rotational motion of the post within the tube when the post is inserted into the tube. A locking member passes through the tube and cooperates with studs of the T-post to inhibit longitudinal movement of the T-post within the tube when the post is inserted therein. A second similar tube may be attached to the first tube such that two T-posts may be inserted in the respective tubes and supported relative to one another in any number of angular orientations, thereby providing support for a wire-formed trellis.

BRIEF DESCRIPTION OF THE DRAWINGS

The features and advantages of the present invention will become apparent upon a reading of the following detailed description taken in conjunction with the accompanying drawings, wherein:

FIG. 8 is an elevational view of another construction of the connector system;

FIG. 9 is an elevational view taken along the line 9—9 of FIG. 8 and showing a second embodiment of the present connector;

FIG. 10 is another construction of the connector system; and

FIG. 11 is a cross-sectional view taken along the line 11—11 of FIG. 9.

DETAILED DESCRIPTION OF THE PREFERRED EMBODIMENTS

Figure 1:
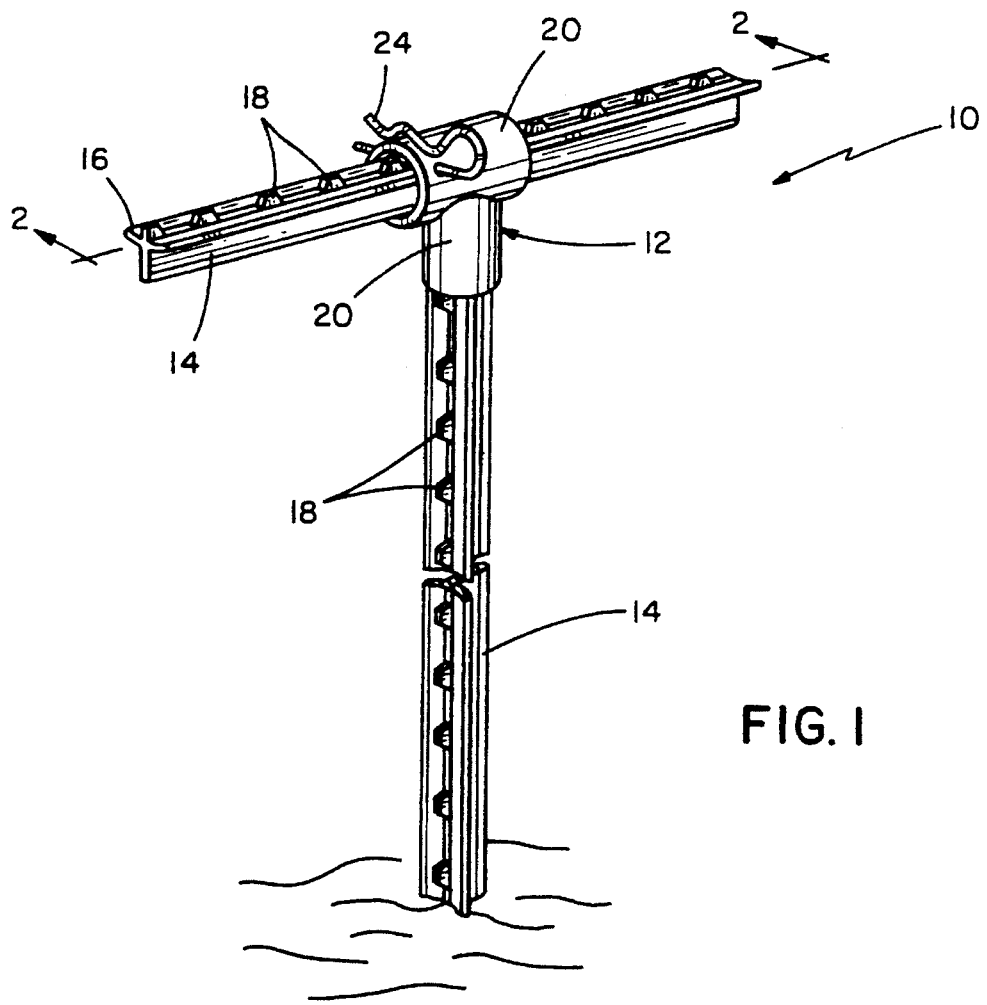
FIG. 1 is a perspective view of a T-post connector system in accordance with the invention.
Figure 2:
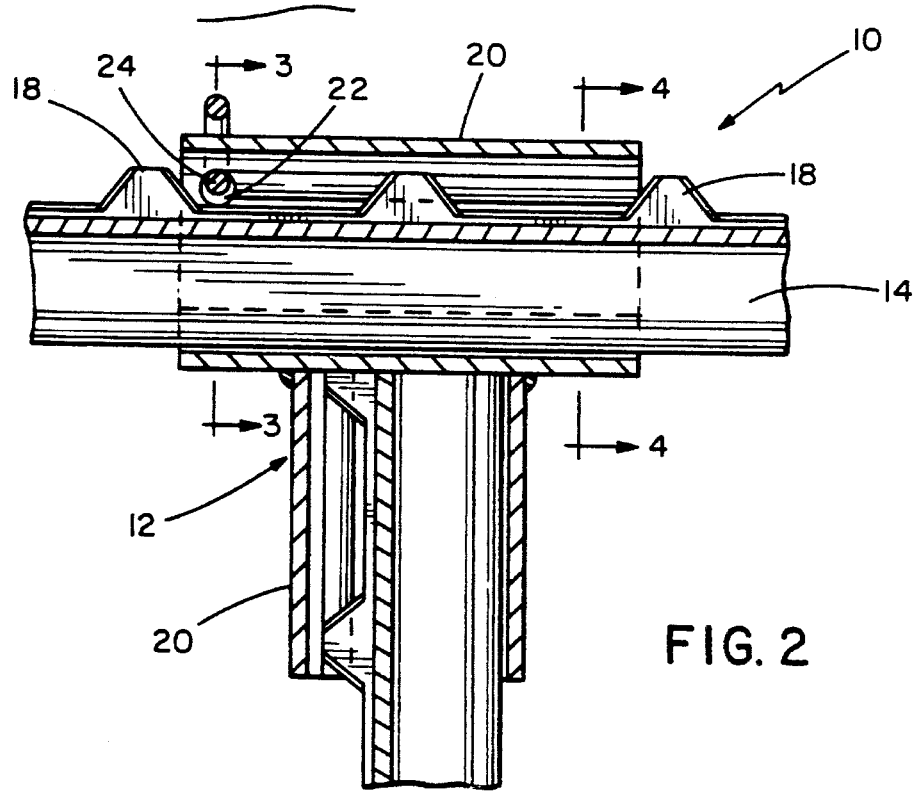
FIG. 2 is a side cross-sectional view taken along the line 2—2 of FIG. 1.

Referring now to the drawings, and initially to FIGS. 1 and 2, a connector system in accordance with the invention is designated generally by the reference numeral 10. In this construction of the invention, the system 10 includes a T-connector 12 which is especially suited for interconnecting two studded T-posts 14 in a T-configuration. The T-posts 14 are of standard construction and are preferably formed from steel to have a generally T-shaped cross-section. The cross member 16 of the post 14 is provided with studs 18 formed at regular spaced intervals along the length of the post 14 and projecting outwardly at right angles to the cross member 16. In a conventional manner, the studs 18 serve to positively locate a wire strapped to the posts 14. Accordingly, the system 10 of the present invention is well adapted to the construction of trellises.

In one embodiment of the invention, the connector 12 is formed from tubular segments 20. Although various cross-sections for the tube segments 20 may be used, a tube segment 20 having a circular cross-section is desirable because it can slidingly receive a studded T-post 14 with a minimum amount of tube 20 material. Tube segments 20 may be manufactured as by welding, casting or forming. At one end of the tube segments 20 are apertures 22 for receiving a locking pin 24. The locking pin may be a bolt or a cotter pin which is so dimensioned as to extend completely through the walls of the tube 20 and cooperate with a pair of studs 18 of the post 14 to inhibit relative longitudinal movement of the post 14 within the tube 20.

Figure 3:
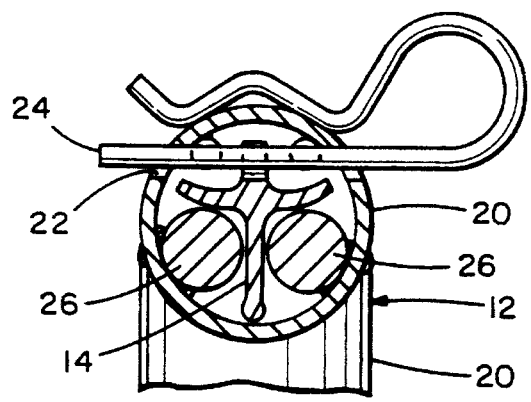
FIG. 3 is a cross-sectional view taken along the line 3—3 of FIG. 2.
Figure 4:
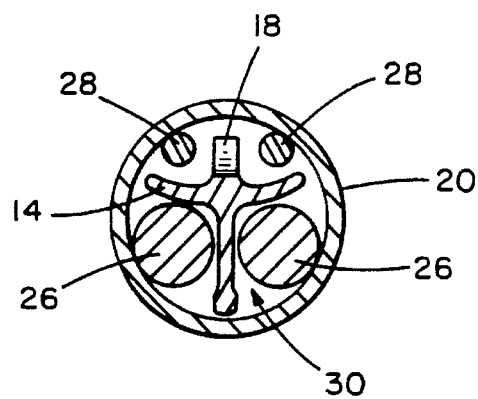
FIG. 4 is a cross-sectional view taken along the line 4—4 of FIG. 2.

FIGS. 3 and 4 show cross-sections of the tube segments 20 wherein it can be seen that in this embodiment of the invention, rods 26 and 28 are attached to the inside walls of the tube segments 20 defining a keyway 30. The rods 26 and 28 are so dimensioned that the keyway 30 defined thereby permits post 14 to be slidingly received by the tube segments 20 while preventing relative rotational movement of the post 14 when it is inserted into the tube 20. The rods 26 and 28 may extend the entire length of the tube segments 20 or they may be short segments secured to the tube segments 20 by welding.

Figure 5:
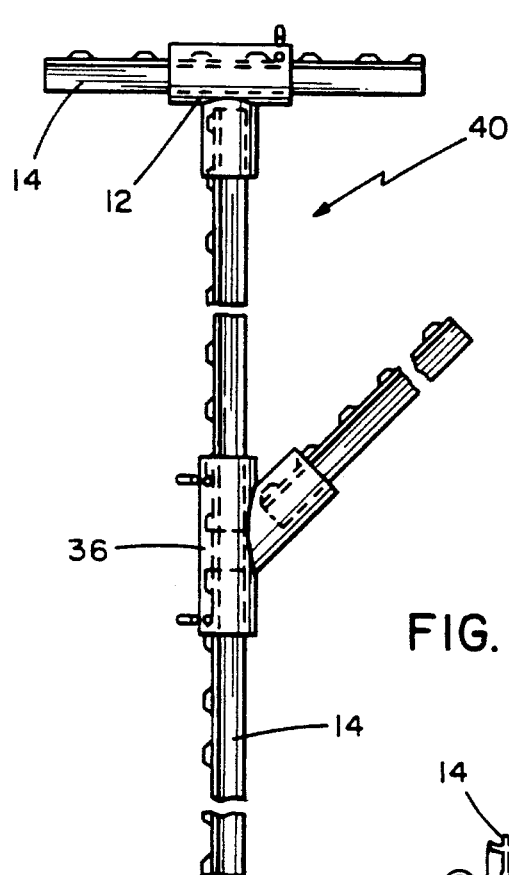
FIG. 5 is an elevational view of one construction of the connector system.
Figure 6:
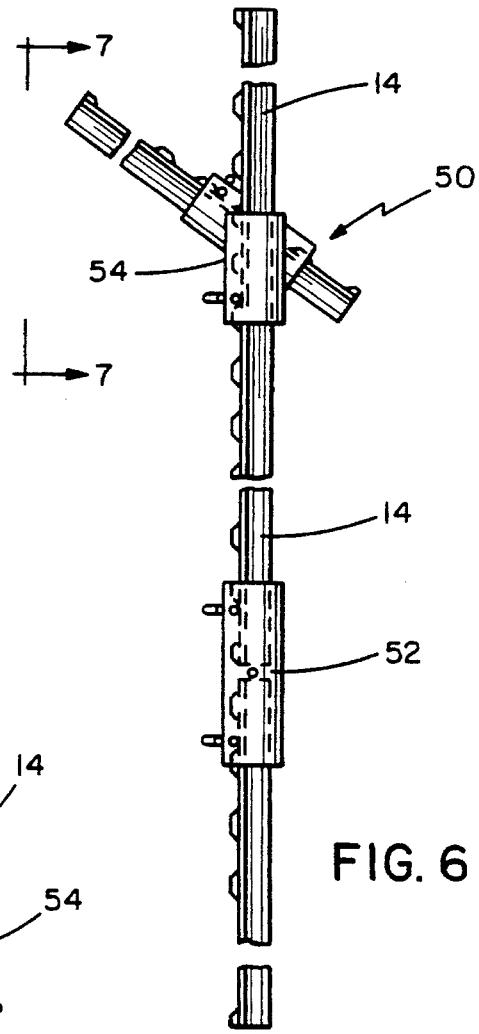
FIG. 6 is an elevational view of another construction of the connector system.
Figure 7:
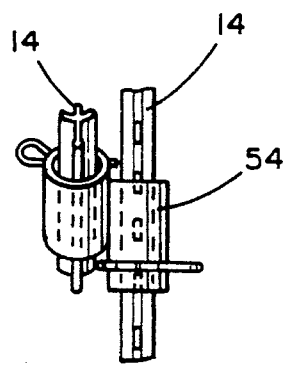
FIG. 7 is an elevational view taken along the line 7—7 of FIG. 6.

Referring now to FIGS. 5–10, it can be seen that various augmentations of a connector system 10 in accordance with the invention are possible. In FIG. 5, for example, a T-connector 12 is shown in combination with a y connector 36 in one arrangement 40. In another arrangement 50, as shown in FIGS. 6 and 7, a coupling connector 52 is illustrated in combination with an angled cross connector 54. In FIG. 8, an assembly 60 is illustrated in which a 45° elbow 62 is used in combination with a 90° cross connector 64. In FIG. 10, a T connector 12 is illustrated with another y connector 72 in yet another configuration 70. These FIGS. 5–10 illustrate that numerous combinations of connectors 12, 36, 52, 54, 62, 64 and 72 are possible for use with T-posts 14 to create a wide variety of post configurations.

Turning now to FIGS. 9 and 11, a second embodiment of the connector system is illustrated wherein connector 64 is formed integrally from a suitable plastic material, for example. In this embodiment, tube segments 80 are molded with internal projections 82 and formations 84 formed integrally with the inner wall of the segments 80 which together define an internal keyway 85 for slidingly receiving a T-post 14 and preventing rotational movement of the post 14 relative to the tube 80. This embodiment of the invention may also have suitable through apertures like the apertures 22 of the aforedescribed tee connector 12 to receive pins 86 for inhibiting longitudinal movement of the post 14 relative to the connector 64.

It can now be appreciated that the connector system according to the present invention may be advantageously employed in the construction of trellis systems. Because of the wide variety of ways in which tube segments 20 may be connected or molded relative to one another, numerous angular configurations of connectors are possible. Because a t-post is loosely received by the connector, yet positively locked thereto, the connector may be easily installed on a post and is capable of being readily assembled and disassembled or adjusted as to position. This feature makes the instant system 10 highly adaptable for constructing sturdy trellises of the type needed to support climbing plants of various types and, in particular, grape vines.

While the present invention has been described in connection with preferred embodiments thereof, it will be understood by those skilled in the art that many changes and modifications may be made without departing from the true spirit and scope of the invention. It is, therefore, intended by the appended claims to cover all such changes and modifications as come within the true spirit and scope of the invention.

What is claimed is:

1. A connector in combination with a studded post member, said connector comprising a first tube;

a keyway internal to said first tube for slidingly receiving said studded post member and configured to prevent relative rotational motion of said post member within said tube when said post member is inserted into said tube; and a pin extending transversely through said tube for inhibiting relative longitudinal movement of said post member within said tube when said post member is inserted into said tube wherein said pin cooperates with a stud on said post member to inhibit said longitudinal movement.

2. The connector of claim 1 wherein said pin cooperates with a pair of studs on said post member to inhibit said longitudinal movement in two directions.

3. The connector of claim 1 further including a second tube connected to said first tube, said second tube being dimensioned and configured to receive and support a second post member.

4. The connector of claim 3 wherein said second tube has a longitudinal axis extending at an angle to the longitudinal axis of said first tube.

5. The connector of claim 3 wherein said second tube is provided with a keyway internal thereto for preventing relative rotational motion of said second post member within said second tube when said second post member is received within said second tube.

6. The connector of claim 5 wherein said keyway internal to said second tube is defined by a plurality of rods running lengthwise in said second tube.

7. The connector of claim 1 wherein said keyway is defined by a plurality of rods running lengthwise in said first tube.

8. The connector of claim 1 wherein said first tube and keyway are integrally molded.

9. The connector of claim 8 wherein said keyway comprises projections internal to said first tube.

10. A system for constructing a trellis, said trellis configured to support a plurality of wires for supporting climbing plants, comprising:

first and second tubes, said tubes being connected to one another at an angle with respect to their longitudinal axes;

first and second studded post members each slidingly receivable within a respective said tube;

a keyway internal to each tube configured to prevent relative rotational motion of said post member within said tube when said post member is inserted into said tube; and locking means cooperable with each said post member for inhibiting relative longitudinal movement of said post member within said tube when said post member is inserted into said tube.

11. The system of claim 10 wherein said locking means comprises a pin.

12. The system of claim 11 wherein said pin extends transversely through each tube.

13. The system of claim 11 wherein said pins cooperate with studs on said post members to inhibit said longitudinal movement.

14. The system of claim 10 wherein said tubes and keyways are integrally formed as a single unit.

15. The system of claim 14 wherein said keyways comprise projections internal to each tube.

\* \* \* \* \*